July 8, 1941.  W. EFFENBERGER  2,248,917
SEAT CUSHION
Filed Dec. 27, 1939
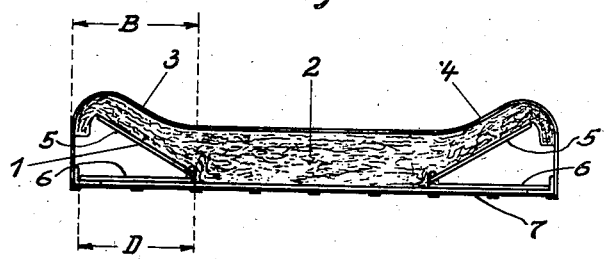
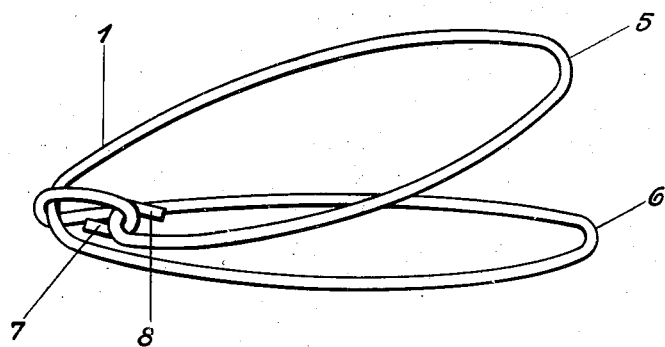
Inventor
Willibald Effenberger
By
Attorneys Patented July 8, 1941

2,248,917

UNITED STATES PATENT OFFICE 2,248,917

SEAT CUSHION

Willibald Effenberger, Fellbach, near Stuttgart, Germany, assignor to Dr. Ing. h. c. F. Porsche K.-G., Stuttgart-Zuffenhausen, Germany, a company of Germany Application December 27, 1939, Serial No. 311,095
In Germany December 22, 1938

7 Claims. (Cl. 155—179)

This invention relates to improvements in seat cushions and similar upholstered articles and is especially applicable to seat cushions for power vehicles. The invention contemplates the provision of such cushions in which wedge-shaped coil springs are arranged adjacent the edge thereof.

It is an object of the present invention to overcome objections to previous constructions by providing superimposed coils of a coil spring which are connected together at one side. Thereby the construction of the individual springs is greatly simplified since the desired number of turns may simply be cut from a long coil spring and then attached together in accordance with the invention.

The new coil spring has the advantage that it gives a particularly desirable form to the cushions even though the cushions be of small dimensions.

It is another object to provide such springs in which the end windings of the spring lie in planes so that they bear firmly upon the seat base and support the seat filling in a very desirable manner.

The ends of the individual coils may be connected together by any suitable means such as by clamps. However, it is preferred that their ends be bent to form hooks which engage each other as this is considerably simpler and cheaper. The bending of the ends of the coils and their interconnection may be performed by machinery or by unskilled labor so that the manufacturing cost thereof is very low.

An especially advantageous form of the construction is that in which only two windings are used. At lowest possible cost a very satisfactory conformation of the resulting upholstered article having very desirable springing characteristics may be made.

Other objects will appear from the following description of an illustrative embodiment of the invention taken together with the attached drawing wherein:

Fig. 1 is a vertical cross-section through a vehicle seat made in accordance with the invention; and Fig. 2 is a perspective view of the coil spring shown in Fig. 1.

The upholstered article shown in Fig. 1 is provided near its edges with a coil spring I made in accordance with the invention and includes a seat base 7 and filling 2 of resilient material such as rubber threads, sponge rubber, or the like thereon. The seating surface is formed with raised edges 3 and 4 which have been found to contribute greatly to the comfort of the user and which prevent the occupant from sliding off the seat. As shown, the breadth B of the raised portions 3 and 4 corresponds approximately to the diameter D of the coil springs I and thereby provides a favorable dimensioning of the seat and gives it a comfortable form. As shown in Fig. 1, one spring I is positioned on the base 7 on each side of the seat, but it will be obvious, depending upon the desired length of seat, that a series of such springs may be positioned one after the other on each side to form opposite upstanding edges.

The coil spring indicated by the numeral I in Fig. 1 is shown in Fig. 2. It comprises two windings 5 and 6 made of spring wire whose ends are formed into hooks 7 and 8 which are interconnected to form a wedge-shaped spring, of very desirable form for use on the edge or edges of seats as shown on Fig. 1.

The utilization of the invention is not limited to seats for power vehicles but can also be applied to upholstered furniture, it being understood that in all cases it is not essential that the coil spring be formed as cylinders or even as wedge-shaped, as the bearing coils may be either circular or triangular, or any other desired form.

Having described an illustrative embodiment of the invention, it is pointed out that various changes and modifications therein may be made without departing from the invention as set forth in the following claims.

I claim:

1. In an upholstered seat, a seat base, a plurality of wedge-shaped springs arranged along at least one edge thereof with their expanded edges outwardly, and resilient material a part of which is supported upon said base and another part of which overlies and is supported upon said wedge-shaped springs whereby a raised resilient edge portion is provided.

2. A spring for use in the edges of upholstered articles, comprising a plurality of turns of spring wire lying generally in planes, all of which intersect along a common line to form a wedge-shaped spring, and means for attaching the ends of said wire together substantially at the line of intersection of said plane, said means engaging the plurality of turns to hold the same in interconnecting relationship.

3. A spring for use in the edges of upholstered articles, comprising a plurality of turns of spring wire lying generally in plane, all of which intersect along a common line to form a wedge-shaped spring, and means for interconnecting the ends of the outer turns with one another and with the intermediate parts of said wire substantially at the common line of intersection of said plane.

4. A spring for use in the edges of upholstered articles comprising a plurality of turns of spring wire lying generally in planes which intersect the ends of which wire are formed into hooks interengaging each other at least one of said hooks surrounding an intermediate part of said wire whereby a wedge-shaped spring is formed.

5. A spring for use in the edges of upholstered articles comprising two turns of spring wire, and means including bent portions of the spring wire itself for attaching the ends of said spring wire together in such manner that a wedge-shaped spring is formed.

6. A spring for use in the edges of upholstered articles comprising two turns of spring wire, and means including bent portions of the spring wire itself for bringing and holding the ends of said spring wire together in such manner that a wedge-shaped spring is formed.

7. A spring for use in the edges of upholstered articles comprising two turns of spring wire the ends of which are formed into hooks interengaging each other and an intermediate part of said wire in such manner that a wedge-shaped spring is formed.

WILLIBALD EFFENBERGER.